(12) United States Patent
Fujita et al.

(10) Patent No.: US 7,152,144 B2
(45) Date of Patent: Dec. 19, 2006

(54) CENTRALIZED STORAGE MANAGEMENT METHOD

(75) Inventors: Takahiro Fujita, Yokohama (JP);
Hiroshi Arakawa, Sagamihara (JP);
Takashi Oeda, Sagamihara (JP);
Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 10/225,159

(22) Filed: Aug. 22, 2002

(65) Prior Publication Data
US 2003/0225982 A1   Dec. 4, 2003

(30) Foreign Application Priority Data
May 29, 2002   (JP)   ............... 2002-154943
May 29, 2002   (JP)   ............... 2002-154944

(51) Int. Cl.
*G06F 12/02*   (2006.01)
*G06F 12/14*   (2006.01)

(52) U.S. Cl. .................. 711/148; 711/4; 711/114; 711/154; 711/170; 711/163

(58) Field of Classification Search .......... 711/114, 711/170, 148, 154, 207, 210, 4, 163
See application file for complete search history.

(56) References Cited

U.S. PATENT DOCUMENTS

| | | | |
|---|---|---|---|
| 4,121,286 A * | 10/1978 | Venton et al. | ............... 707/206 |
| 5,109,336 A * | 4/1992 | Guenther et al. | ........... 711/171 |
| 6,532,517 B1 * | 3/2003 | Wagner et al. | ............... 711/112 |
| 6,564,307 B1 * | 5/2003 | Micka et al. | ................ 711/156 |
| 6,697,881 B1 * | 2/2004 | Cochran | ......................... 710/5 |
| 6,782,458 B1 * | 8/2004 | Noble | .......................... 711/163 |
| 2002/0141236 A1 * | 10/2002 | Nakai et al. | ............ 365/185.03 |
| 2003/0046238 A1 * | 3/2003 | Nonaka et al. | ............... 705/51 |
| 2003/0196089 A1 * | 10/2003 | Alve et al. | ................... 713/172 |

OTHER PUBLICATIONS

"Managing Your Hard Disk" book Year: 1987; Author: Berliner, Publisher: Que; pp. 263-266.*

* cited by examiner

*Primary Examiner*—Matthew Kim
*Assistant Examiner*—Hetul Patel
(74) *Attorney, Agent, or Firm*—Mattingly, Stanger, Malur & Brundidge, P.C.

(57) ABSTRACT

A storage system includes plural storage apparatuses storing data, and a storage controller which transmits and receives data between an external computer and the plural storage apparatuses, and further controls the plural storage apparatuses. Logical devices each representing a logical storage area are defined on the storage apparatuses. When one logical device is in a state of allocation to the external computer and stores data used by the external computer, and the logical device is deallocated from the external computer, the storage controller performs a processing such as erasing data from the logical device to be deallocated. The processing is performed according to the logical device being deallocated.

18 Claims, 14 Drawing Sheets

FIG. 2

| DEVICE IDENTIFIER | STORAGE PORT IDENTIFIER | CHANNEL ADAPTER NUMBER | COMPUTER PORT IDENTIFIER |
|---|---|---|---|
| HITACHI R400 1111 0101 | WWN1 | 1 | WWNA |
| HITACHI R400 1111 0102 | WWN2 | 1 | WWNB |
| HITACHI R400 1111 0103 | WWN1 | 1 | WWNA |
| HITACHI R400 1111 0104 | IPADDRESS3 | 2 | IPADDRESSD |

FIG. 8

| DEVICE IDENTIFIER | CAPACITY | DATA STATE | ACCESSING COMPUTER | LEVEL OF CON-FIDENTIALITY |
|---|---|---|---|---|
| HITACHI R400 1111 0101 | 20GB | USED | COMPUTER 1 | HIGH |
| HITACHI R400 1111 0102 | 80GB | USED | COMPUTER 2 | LOW |
| HITACHI R400 1111 0103 | 40GB | INITIALIZED | NONE | HIGH |
| HITACHI R400 1111 0104 | 40GB | INITIALIZED | NONE | NO LEVEL |
| HITACHI R400 1111 0105 | 40GB | USED | COMPUTER 3 | LOW |
| HITACHI R400 1111 0106 | 80GB | INITIALIZED | NONE | NO LEVEL |
| HITACHI R400 1111 0107 | 40GB | DATA-STATE UNKNOWN | NONE | NO LEVEL |
| HITACHI R400 2222 0102 | 80GB | INITIALIZED | NONE | NO LEVEL |
| HITACHI R400 2222 0104 | 40GB | USED | COMPUTER 1 | HIGH |

FIG. 9

| STORAGE APPARATUS IDENTIFIER | CHANNEL ADAPTER NUMBER | STORAGE PORT IDENTIFIER |
|---|---|---|
| HITACHI R400 1111 | 1 | WWN1 |
| HITACHI R400 1111 | 1 | WWN2 |
| HITACHI R400 1111 | 2 | IPADDRESS3 |
| HITACHI R400 1111 | 2 | IPADDRESS4 |
| HITACHI R400 2222 | 1 | WWN8 |
| HITACHI R400 2222 | 1 | WWN9 |

840

| COMPUTER IDENTIFIER | COMPUTER PORT IDENTIFIER |
|---|---|
| COMPUTER 1 | WWNA |
| COMPUTER 2 | WWNB |
| COMPUTER 3 | IPADDRESSC |
| COMPUTER 4 | IPADDRESSD |
| ADMINISTRATIVE COMPUTER | IPADDRESSE |

CENTRALIZED STORAGE MANAGEMENT METHOD

BACKGROUND OF THE INVENTION

Recently, a technique for connecting a computer with plural storage apparatuses through communication lines (a storage area network (SAN)) to centrally manage the storage apparatuses connected to the SAN has been proposed.

One method of managing plural storage apparatuses connected to a SAN is a technique in which storage areas of the plural storage apparatuses connected to the SAN is collectively managed as a storage pool to make effective use of the storage capacities or extents of the storage apparatuses connected to the SAN.

As the amount of data increases with the growth of computerization, a company often needs to replace an already-possessed storage apparatus with a new storage apparatus of larger memory sizes. In this case, only data in a previously-used storage apparatus is erased, and the storage apparatus is often reused without being scrapped.

On the other hand, a computer writes management information necessary for using a storage apparatus into the storage apparatus.

For example, a PC/AT compatible computer ("PC/AT" is a trademark of IBM Ltd., and is called "PC" below) divides a storage area of a storage apparatus into plural partitions so that each of the divided areas is used independently. In this case, management information (MBR: Master Boot Record) related to this division is written into the first sector of a storage medium such as a hard disk loaded in the storage apparatus.

Even in an environment in which a storage apparatus is centrally managed in a storage pool, management information used by a computer such as MBR is written into the storage apparatus. If such a storage apparatus in which the management information is written is allocated to another computer connected to the SAN, the other computer cannot use the storage apparatus normally or cannot recognize the storage apparatus correctly. In this case, a system manager needs to take on the task of solving this problem such as erasure of the management information in addition to the management work in the storage pool.

Further, when a storage apparatus is shared in the storage pool among plural computers and a system manager forgets to erase important data written while one computer is using it, another computer to which the storage apparatus is allocated next may read the important data which is forgot to be erased.

SUMMARY OF THE INVENTION

It is an object of the present invention to provide a method for sharing a plurality of storage apparatuses among plural computers while ensuring the confidentiality of data stored in the plurality of storage apparatuses connected to a SAN.

In order to solve the above-mentioned problems, according to the present invention, a user is allowed to set prescribed levels (for example, levels of confidentiality) for logical devices of a plurality of storage apparatuses, in a system in which computers and the plurality of storage apparatuses are connected through a network. Further, in the system, the logical devices are collectively managed by an administrative computer connected to the network. Then, when allocating a logical device to a computer or releasing the logical device currently allocated to the computer, the administrative computer controls the storage apparatus concerned to erase data, which is stored in the logical device, in a predetermined method according to the level of confidentiality set for the logical device.

The predetermined method may be a method of overwriting all data stored in the logical device with a predetermined value such as "0", a method of erasing only the information for managing the data stored in the logical device, or a method of erasing data by providing a bitmap in a storage apparatus or hard disk drive and controlling the value of the bitmap. According to the present invention, these methods of data erasure can be selected according to the importance of data stored in the logical device.

In a preferred embodiment, a method of using the data-erasing methods according to the state of data stored in the logical device can be considered.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing contents of an access control table;

FIG. 8 is a diagram showing contents of a device management table;

FIG. 9 is a diagram showing contents of a network-zone member management table and a network-zone management table;

FIG. 10 is a diagram showing contents of a storage-port management table and a computer-port management table;

DESCRIPTION OF THE EMBODIMENT

Figure 1:
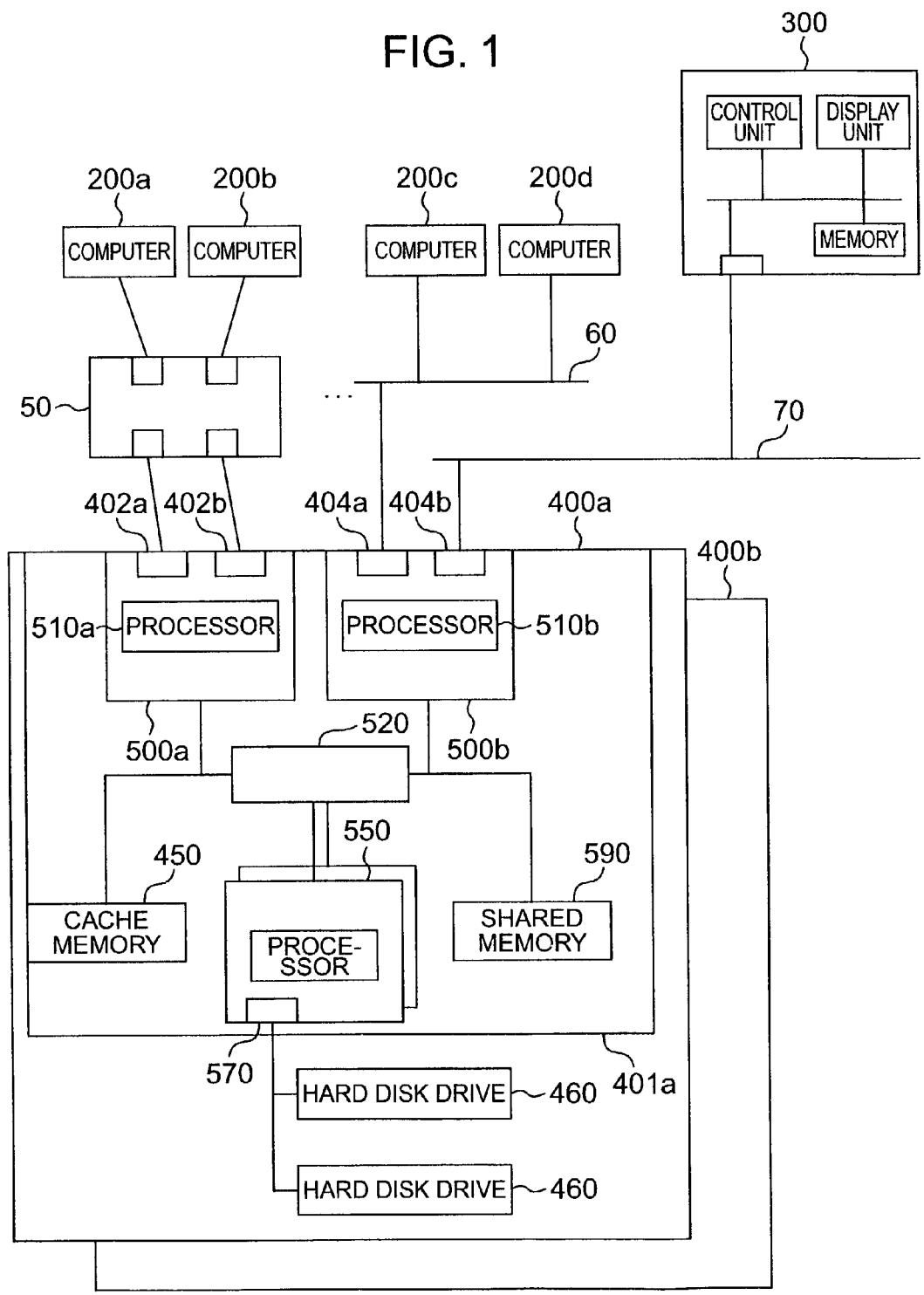
FIG. 1 is a block diagram of a computer system to which the present invention is applied.

FIG. 1 is a block diagram showing an embodiment of a computer system to which the present invention is applied. A computer system 1 includes computers 200a, 200b, 200c and 200d (collectively called "computer 200"), an administrative computer 300, a fibre channel switch 50, Internet protocol (hereinafter called "IP") networks 60 and 70, and storage apparatuses 400a and 400b (collectively called "storage apparatus 400").

The storage apparatus 400a is connected to the computers 200a and 200b through the fibre channel switch 50. The storage apparatus 400a is connected to the computers 200c and 200d through the IP network 60. The storage apparatus 400 is further connected to the administrative computer 300 through the IP network 70.

The computers 200a and 200b connected to the storage apparatus 400a through the fibre channel switch 50 transfer data using a SCSI Protocol over Fibre Channel (hereinafter called "FCP"). The computers 200c and 200d connected to the storage apparatus 400a through the IP network 60 transfer data using an iSCSI protocol capable of transferring a SCSI command through the IP protocol.

Like a normal computer, the administrative computer 300 includes a control unit, a memory, a storage unit, a display unit, and an interface connected to the network 70. The administrative computer 300 reads a program, which is stored in the storage unit, into the memory. The control unit executes the program to control the storage apparatus 400, which is connected to the network 70, through the network 70.

The storage apparatus 400 includes a control unit 401 and hard disk drives 460. The control unit 401 has channel adapters 500a and 500b (collectively called "channel adapter 500"), a cache memory 450, a shared memory 590, a disk adapter 550 and a crossbar switch 520. The channel adapter 500, the cache memory 450, the shared memory 590 and the disk adapter 550 are connected together through a crossbar switch 520. A bus may be used instead of the crossbar switch 520.

The hard disk drive 460 is connected to the disk adapter 550 through a port 570. The storage apparatus 400 may have a plurality of disk adapters 550. In this case, the disk adapters 550 are connected to the crossbar switch 520, respectively. The hard disk drives 460 are connected to each of the disk adapters 550.

The channel adapter 500 is assigned a number. This number (hereinafter called "channel adapter number") specifies the channel adapter 500.

The channel adapter 500a has fibre channel ports 402a and 402b, and a processor 510a. The channel adapter 500a accepts an I/O request based on the FCP protocol, which is issued by the computers 200a and 200b, through the fibre channel port 402a.

The channel adapter 500b has IP network ports 404a and 404b, and a processor 510b. The channel adapter 500b accepts an I/O request based on the iSCSI protocol, which is issued by the computers 200c and 200d, through the IP network port 404a. The IP network port 404b is connected to the administrative computer 300. The channel adapter 500b communicates with the administrative computer 300 through the IP network port 404b.

The storage apparatus 400a has one or more logical devices as logical storage areas. The logical devices correspond to all or part of storage areas of the hard disk drives 460. The logical devices are storage areas which are recognized by the computer 200 and identified by unique identifiers at least in the computer system 1. The computer 200 uses the FCP and the iSCSI to make the I/O request to the logical devices of the storage apparatus 400a.

The disk adapter 550 controls the cache memory 450 and the hard disk drives 460 in the storage apparatus 400 to transfer data among the cache memory 450, the hard disk drives 460 and the disk adapter 550. The disk adapter 550 controls the hard disk drives 460, for example, as a RAID with redundancy, to increase the reliability and performance of the storage apparatus 400. The number of the hard disk drives 460 incorporated in the storage apparatus 400 may be either one or plural.

Since data transfer between the hard disk drive 460 and the channel adapter 500 is slower than that between the cache memory 450 and the channel adapter 500, the storage apparatus 400 stores frequently-accessed data in the cache memory 450 to improve data transfer performance.

The storage apparatus 400 can limit the logical devices available for the computer 200. Thereby, it can prevent a logical device currently used by the computer 200a from being used carelessly by the computer 200b, for example.

FIG. 2 shows an access control table 700 used by the storage apparatus 400 for control of access from the computer 200. The access control table 700 is stored in the shared memory 590. Registered in the access control table 700 are device identifiers for use in identifying the logical devices of the storage apparatus 400, storage port identifiers of the storage apparatus 400 for receiving the I/O requests from the computer 200, channel adapter numbers of the channel adapters 500 provided with storage ports such as the fibre channel port 402, and computer port identifiers of the computer 200 permitted to access the storage apparatus 400.

When the port is the fibre channel port 402a, the port identifier is a port WWN (World Wide Name) assigned to the port, for example. On the other hand, when the port is the IP network port 404a, the port identifier is an IP address assigned to the port. The channel adapter 500 refers to the access control table 700. When the computer port identifier corresponding to the computer 200 which gains access to the storage apparatus 400 is registered, the channel adapter 500 performs the I/O-request processing to the logical device of the computer 200.

The channel adapter 500b connected to the administrative computer 300 performs management-area initialization and data initialization on the logical device identified by the device identifier according to the request from the administrative computer 300. The management-area initialization is processing for erasing management information written by the computer 200. Specifically, in order to delete the MBR written in the first sector of the logical device, the first sector of the logical device is written with "0", for example. This processing is performed by the disk adapter 550 issuing a zero-data write command to a sector of the hard disk drive 460 corresponding to the first sector of the logical device.

On the other hand, the data initialization is processing for writing "0" over all areas of the logical device. Specifically, this processing is performed by the disk adapter 550 issuing the zero-data write command to areas of the hard disk drive 460 corresponding to all areas of the logical device. This processing is to erase all data stored in the hard disk drive 460, and though it takes longer time than the management-area initialization, the data stored in the logical device of the storage apparatus 400 are erased without fail. This processing is performed to erase all data written in the logical device.

Another form of data initialization is a method of managing the erased state of data with information (for example, a bitmap) corresponding to the storage area which the logical device has.

Specifically, the storage apparatus 400 performs the following processing in response to a read request to the logical device from the computer 200. Note that the bitmap is stored in the shared memory 590.

When a value of the bitmap corresponding to the storage area of the logical device as the destination of the read request is a predetermined value (for example, "0"), the disk adapter 550 of the storage apparatus 400 transmits data of "0" to the computer 200 without issuing the read-request command to the hard disk drive 460 corresponding to the logical device. On the other hand, when the value of the bitmap is another predetermined value (for example, "1"), the disk adapter 550 issues the read-request command to the hard disk drive 460, and then transmits the read-out data to the computer 200.

Further, the storage apparatus 400 receiving the data-erase request to the logical device from the computer 200 changes the values of all bitmap memories of the logical device to a predetermined value (for example, "0"). This allows the storage apparatus 400 to disable the computer 200 to read out the data stored in the hard disk drive 460, and hence enable the data initialization.

It should be noted that the method for performing the high-speed data initialization on the logical device can also be performed in the hard disk drive 460.

The following detailed description will be made about the data initialization in the hard disk drive 460.

Figure 3:
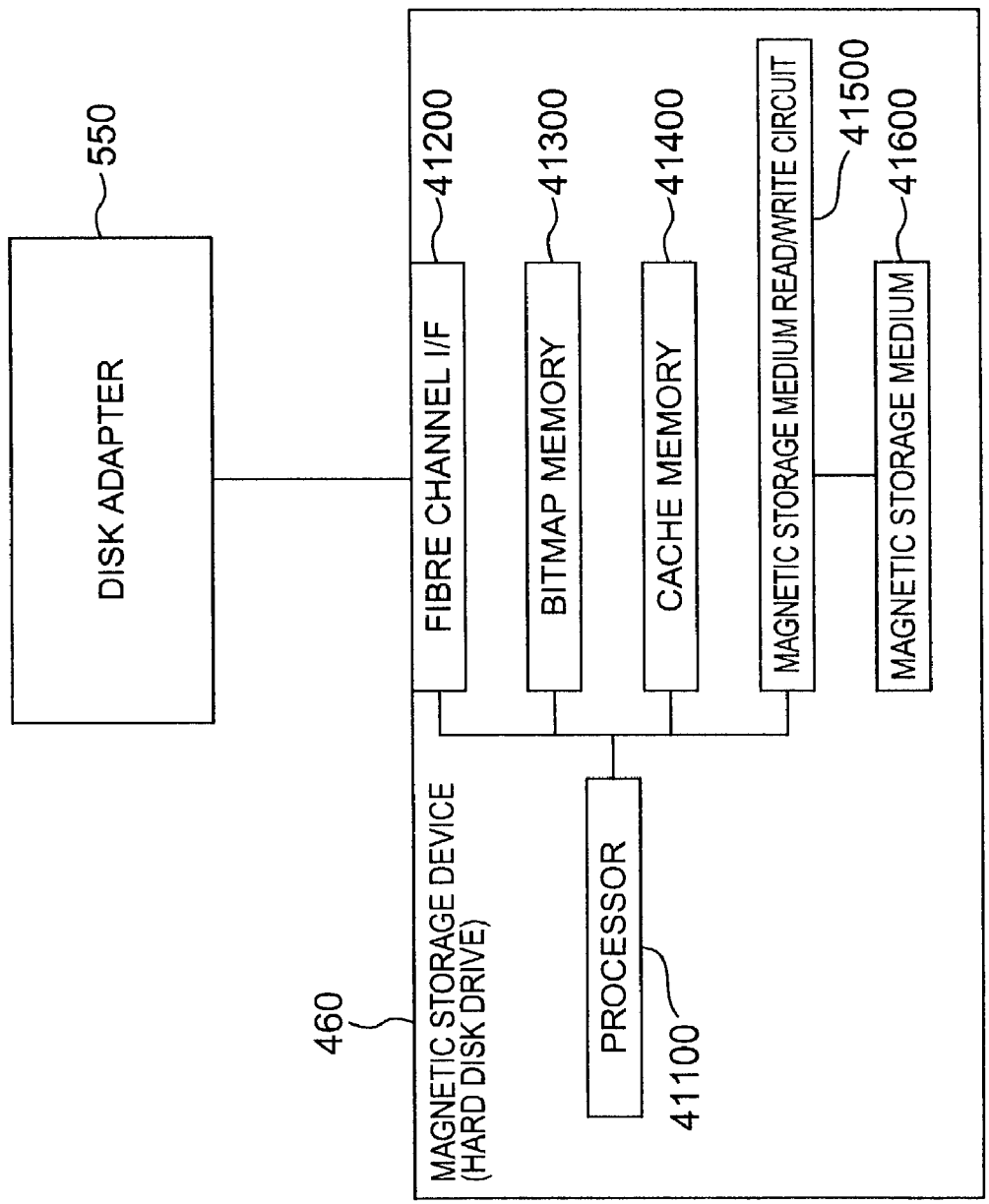
FIG. 3 is a block diagram of a hard disk drive 460.

FIG. 3 is a block diagram of the hard disk drive 460 performing the above-mentioned data initialization. The hard disk drive 460 includes a processor 41100, a fibre channel interface (hereinafter abbreviated as "I/F") 41200, a bitmap memory 41300, a cache memory 41400, a magnetic storage medium read/write circuit 41500 and a magnetic storage medium 41600. Although the remainder of this description provides information on the hard disk drive 460, this technique is not limited to the hard disk drive 460, and it can be applied to the storage apparatus 400 in a like manner.

The fibre channel I/F 41200 is connected to the disk adapter 550. The disk adapter 550 does input and output of data to and from the hard disk drive 460 through the fibre channel I/F 41200. Note that the interface with the disk adapter 550 which the hard disk drive 460 has is not limited to the fibre channel. Further, the disk adapter 550 may be a common or general-purpose computer as long as it includes an arithmetic logical unit.

Figure 4:
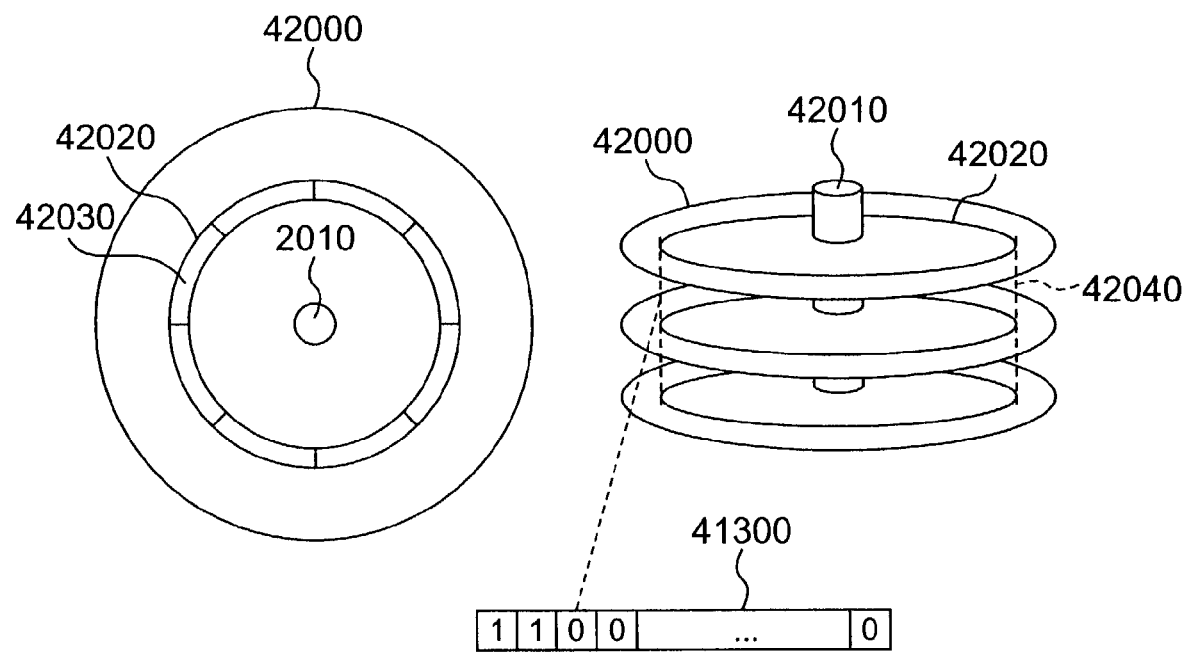
FIG. 4 is an illustration for explaining a magnetic storage medium and a bitmap memory.

FIG. 4 is an illustration for explaining the relationship between the magnetic storage medium 41500 and the bitmap memory 41300.

The magnetic storage medium has plural disc-shaped platters 42000 and a shaft 42010. The surface of the platter 42000 is divided into concentric tracks 42020. The track 42020 is further divided into arc-shaped sectors 42030.

The sector 42030 is assigned a sector number on a track basis so that the position on the track 42020 can be determined.

The track 42020 is assigned a serial number from the outermost track. The serial number is called a track number.

One platter 42000 has two-sided recording surfaces. The hard disk drive 460 includes heads for reading and writing information on the respective recording surfaces of the platter 42000. Each of the heads is assigned a head number so that the recording surface on the platter 42000 is specified by the head number.

A series of tracks 42020 having the same track number and becoming cylinder-shaped when the platters 42000 are stacked in layers are collectively called a cylinder 42040. The cylinder 42040 is assigned a cylinder number serially from the outermost cylinder in the same manner as in the case of the track 42020. Therefore, the track 42020 can be designated by the cylinder number.

Recording and reading of data into and from the hard disk drive 460 are performed in units of the sector 42030 of the magnetic storage medium 42000. The disk adapter 550 which does input and output of data into and from the hard disk drive 460 designates the sector 42030 to read and write data from and to the sector 42030. The size of one sector is generally fixed, and it is 512 bytes.

A sector is designated in two ways: one using an LBA (Logical Block Address) method for designating the serial number assigned to the sector, and the other using a CHS method for designating the cylinder number (C), the head number (H) and the sector number (S).

An address (C, H, S) indicative of the sector 42030 based on CHS is converted to a serial number LBA of the sector 42030 based on LBA by the following equation.

$LBA=(H+C\times(\text{Total Number of Heads}))\times(\text{Number of Sectors per Track})+S$ On the other hand, LBA is converted to (C, H, S) by the following equations.

$C=LBA/((\text{Number of Sectors per Track})\times(\text{Total Number of Heads}))$ $H=((LBA/(\text{Number of Sectors per Track}) \% (\text{Total Number of Heads})$ $S=LBA\% (\text{Number of Sectors per Track})+1$ Note that "A % B" represents a remainder when "A" is divided by "B".

Here, the disk adapter 550 specifies the sector 42030 based on LBA to input and output data into and from the hard disk drive 460.

Bitmaps corresponding to the cylinder numbers are stored in the bitmap memory 41400 sequentially from the first bit. When a bit is "0", it means that the hard disk drive 460 returns "0" as the read data in response to the read request of the disk adapter 550 to the sector 42030 which belongs to the cylinder 42040 corresponding to the bit. For example, since the third bit of the bitmap memory 41300 is "0", the hard disk drive 460 returns "0" in response to the read request to the sector 42030 which belongs to the third cylinder 42040 from the outermost cylinder, in FIG. 4.

The cache memory 41400 is used for the high-speed reading and writing from and to the magnetic storage medium 41600.

The magnetic storage medium read/write circuit 41600 converts data received from the disk adapter 550 into data in a format for writing to the magnetic storage medium 41600. The processor 41100 controls each of the circuit which the hard disk drive 460 includes.

Next, read/write request processing by the hard disk drive 460 will be described. The hard disk drive 460 receives the read and write processing requests by means of the fibre channel I/F 41200.

Figure 5:
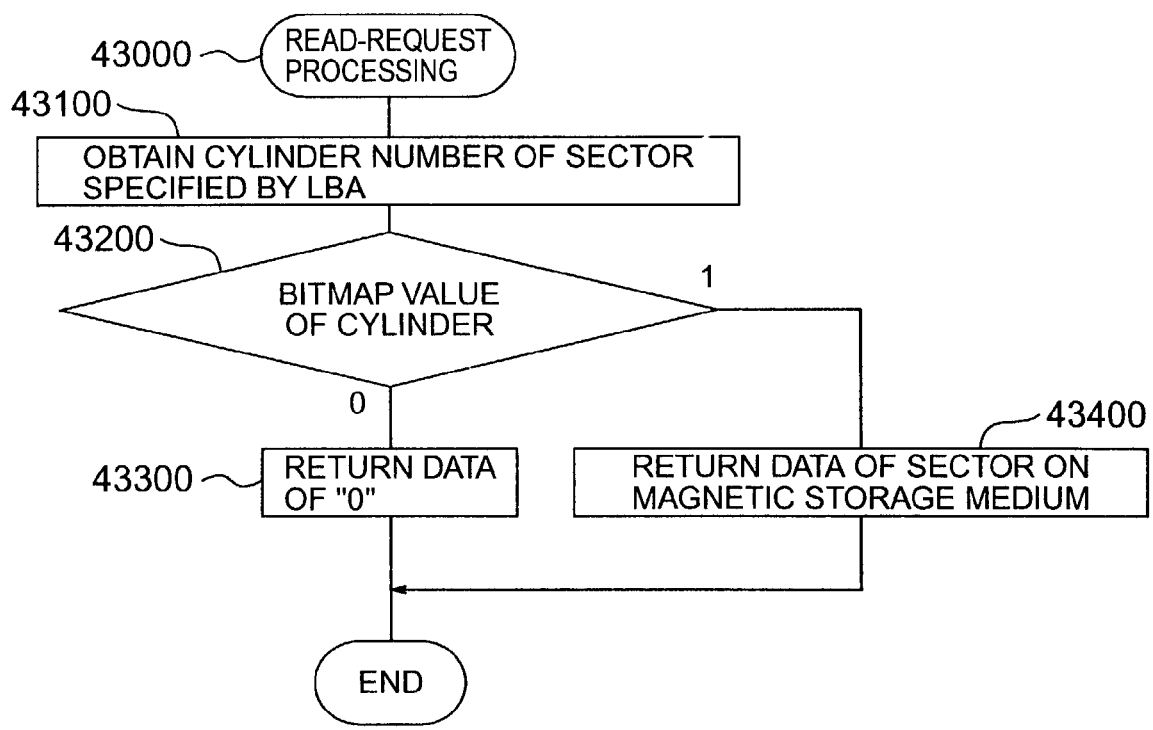
FIG. 5 is a flowchart of read-request processing.

FIG. 5 is a flowchart showing process steps of the read processing in the hard disk drive 460. Upon receipt of the read request, the processor 41100 performs read-request processing 43000 shown in FIG. 5.

From LBA designated by the read-request command of the disk adapter 550, the processor 41100 obtains the cylinder number to which the sector 42030 as the data-reading target belongs. The cylinder number can be obtained by the previously-described conversion equation between LBA and (C, H, S) (step 43100).

The processor 41100 reads the value of the bitmap memory corresponding to the obtained cylinder number C (step 43200). When the value of the bit corresponding to the cylinder number C of the read-out bitmap memory 41300 is "0", the processor 41100 returns data of all "0" to the disk adapter 550, regardless of the contents of data actually stored in the sector 42030, and then ends the processing (step 43300).

In step 43200, when the value of the bit corresponding to the cylinder number C is "1", the processor 41100 controls the magnetic storage medium 41600 and the like to read the data from the sector 42030 of the magnetic storage medium corresponding to the read command, and then transmits the read-out data to the disk adapter 550 (step 43400).

Figure 6:
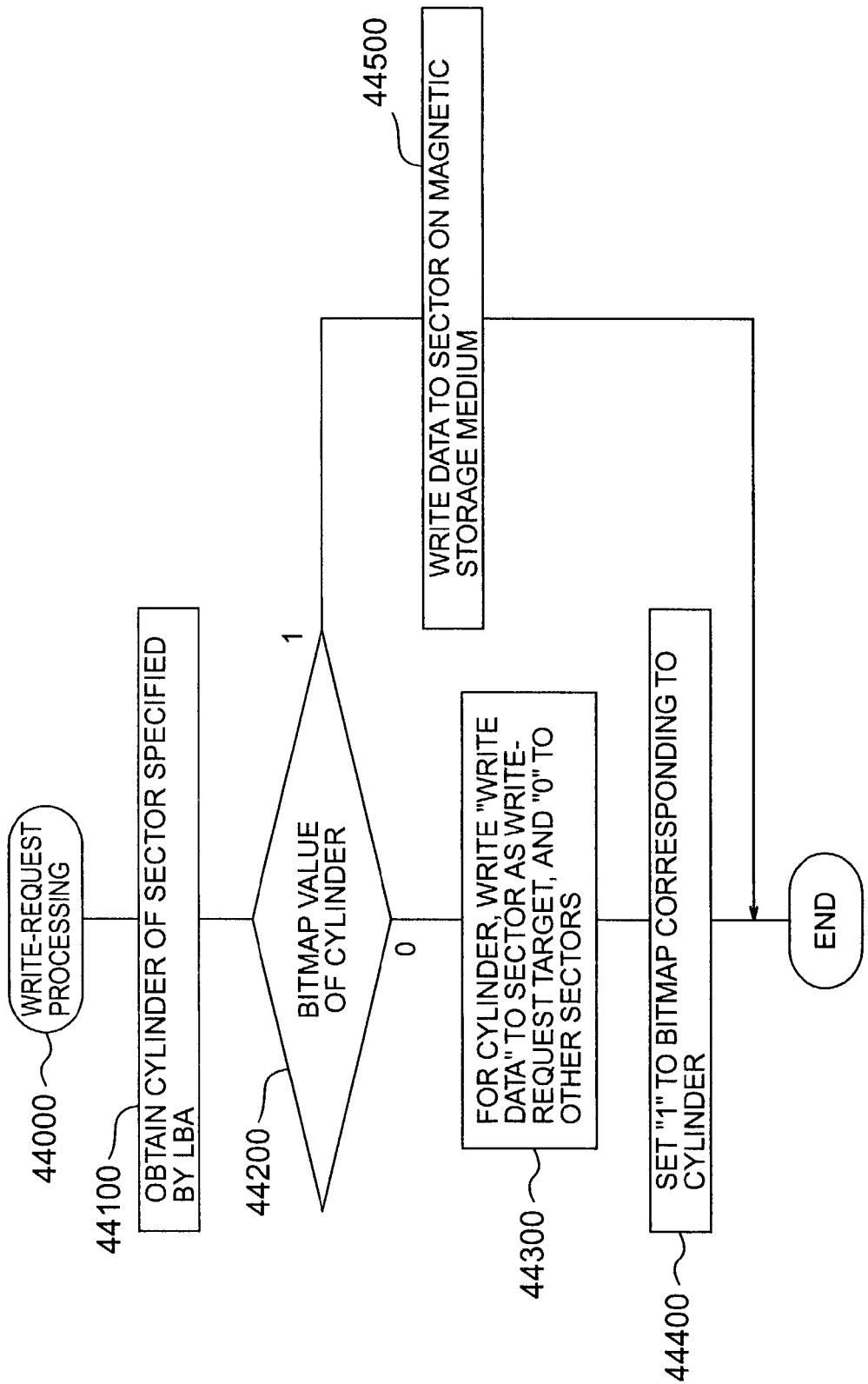
FIG. 6 is a flowchart of write-request processing.

FIG. 6 is a flowchart showing process steps of the write processing by the hard disk drive 460. Upon receipt of the write request, the processor 41100 performs write-request processing 44000 shown in FIG. 6.

The processor 41100 receiving the write request obtains the cylinder number to which the sector as the write target belongs, from LBA designated by the write-request command. The cylinder number can be obtained by the previously-described conversion equation between LBA and (C, H, S) (step 44100).

The processor 41100 reads the value of the bitmap memory 41300 corresponding to the cylinder number C which corresponds to the write request (step 44200). When the read-out bit value is "0", the processor 41100 writes, for the sectors 42030 which belong to the corresponding cylinder number C, the data received from the disk adapter 550 into the sector 42030 of them to which the write request is made, and "0" into the other sectors 42030 (step 44300). After that, the processor 41100 sets "1" for the value of the bit of the bitmap memory 41300 corresponding to the cylinder number C, and then ends the processing (step 44400).

On the other hand, when the value of the bitmap memory 41300 corresponding to the cylinder number C is "1" in step 44200, the processor 41100 writes the data received from the disk adapter 550 into the sector 42030 of the magnetic storage medium 41600, and then ends the processing (step 44500).

Further, when receiving the erase request from the disk adapter 550, the processor 41100 sets "0" for the values of all bits of the bitmap memory 41300.

If the hard disk drive 460 is a SCSI apparatus, the data-erase request from the disk adapter 550 can be assigned a Format Unit command (operation code 04 h). Specifically, when receiving the Format Unit command, the hard disk drive 460 set "0" for the values of all bits of the bitmap memory 41300. If the hard disk drive 460 receives the normal erase command other than the Format Unit command, all data in the hard disk drive 460 are erased in a normal way.

Further, if the hard disk drive 460 has an external I/F other than the fibre channel I/F 41200, the hard disk drive 460 can be designed to accept the data-erase request from the I/F.

In this embodiment, after receiving the data-erase request, the hard disk drive 460 returns data of "0" in response to the read request of the disk adapter 550 to any sector. Therefore, the disk adapter 550 can not read the data recorded on the magnetic storage medium 41600, in accordance with the read request.

Since the data in the hard disk drive 460 is erased merely by setting "0" for the value of the bitmap memory, data even in the large-capacity hard disk drive 460 can be erased at high speed compared to the method for writing "0" for all the sectors 42030.

In the above description, although the bitmap is brought into correspondence with each cylinder 42040, the sectors 42030 can be divided into certain ranges so that the bitmap is brought into correspondence with sectors 42030 divided by each range. For example, if the hard disk drive 460 has 1,000 sectors, the sectors 42030 may be divided into the following ranges: 1 to 100, 101 to 200, 201 to 300, 301 to 400, and the like. In this case, the bitmap memory having 10 bits is prepared so that one bit is brought into correspondence with sectors divided by each range. In the hard disk drive 460, it is then judged to which sector group the sector 42030 designated by the disk adapter 550 belongs, so that data is read by referring to the corresponding bitmap memory. Note that a bit may be brought into correspondence with a sector.

The above-mentioned processing is performed on the logical device of the storage apparatus 400 as follows. First, the storage apparatus 400 provides, in the shared memory 590, the bitmap corresponding to the storage area of the logical device. Then, the processor 510 of the channel adapter 500 of the storage apparatus 400 performs the read-request processing 43000 or the write-request processing 44000 according to the value of the bitmap in response to the I/O request from the computer 200 to the logical device.

Figure 7:
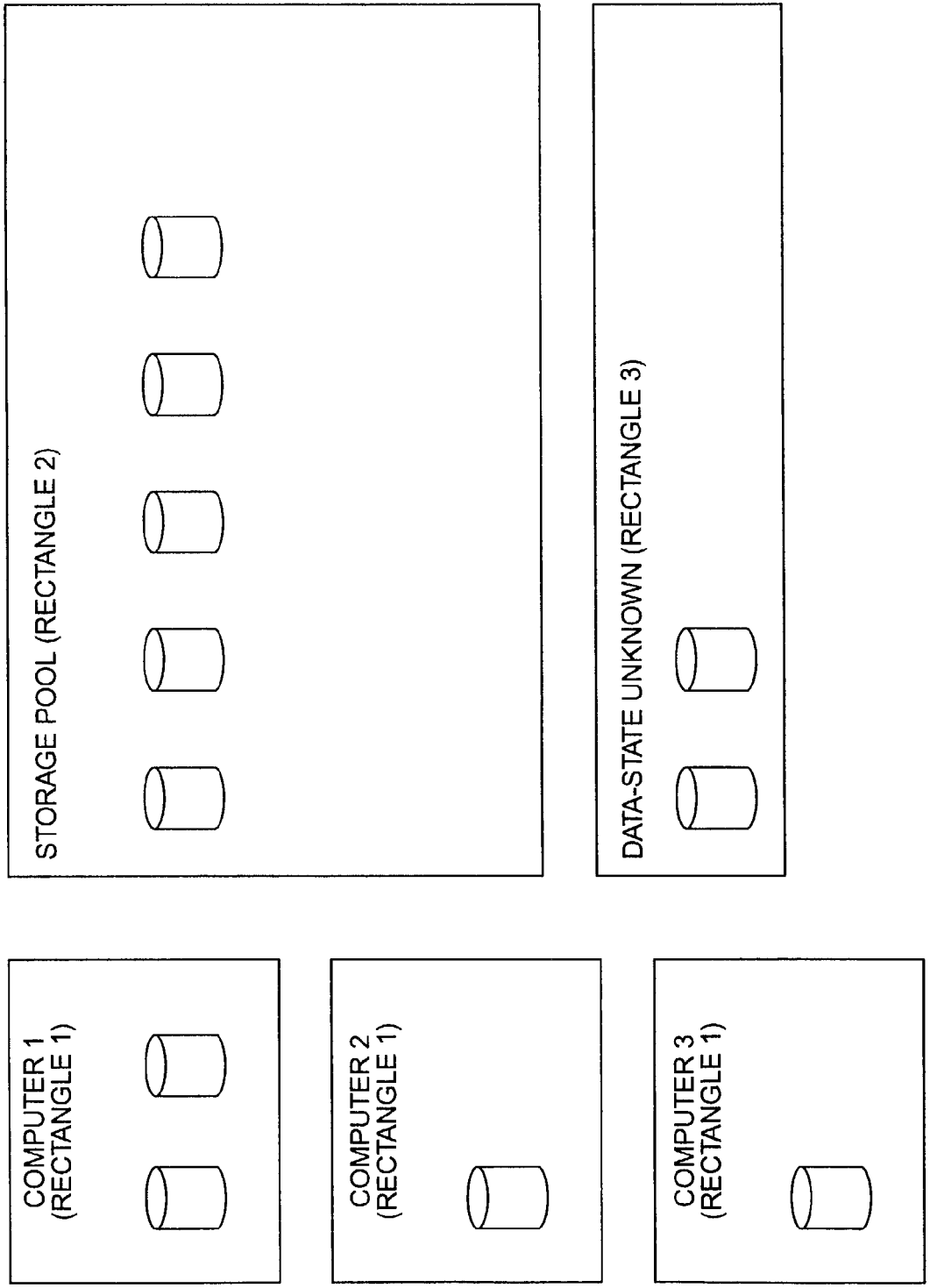
FIG. 7 is a diagram showing a GUI on an administrative computer.

FIG. 7 is a diagram of a GUI (Graphical User Interface) which is displayed on a display screen of the administrative computer 300 and used by the system manager. In the drawing, the logical device of the storage apparatus 400 takes the form of a cylinder and the computer 200 takes the form of a rectangle 1. When a cylinder or cylinders are displayed in the rectangle 1 representative of the computer 200, it means that the computer 200 corresponding to the rectangle 1 is accessible to the logical device or devices of the storage apparatus 400 represented by the cylinder or cylinders.

The cylinders displayed in a rectangle 2 representative of a storage pool represent the logical devices of the storage apparatus 400 which are not currently used by any computer 200.

The cylinders displayed in a rectangle 3 representative of "data-state unknown" represent the logical devices of the storage apparatus 400 which are not currently used by any computer 200 and in which data stored in the logical devices are unknown. The system manager uses this GUI to allocate the logical device or devices of the storage apparatus 400 to the computer 200.

FIG. 8 is a diagram showing a device management table 800 to be managed by the administrative computer 300. The device management table 800 is stored in the memory of the administrative computer 300. The GUI shown in FIG. 7 is depicted in the display unit of the administrative computer 300 based on the device management table 800. Registered in the device management table 800 are device identifiers, storage capacities or extents and data states of logical devices of the storage apparatus 400, and information indicative of correspondences with the computer 200 which is accessing the logical device.

The data state indicates the state of data stored in the logical device corresponding to the device identifier. The logical device could be in one of four states: "Used", "Preserved", "Initialized" and "Unknown". "Used" denotes that the logical device is allocated to and used by the computer 200. "Preserved" denotes that the logical device is not currently allocated to the computer 200 but it retains data written by the computer 200 which has previously used the logical device.

"Initialized" denotes that the logical device is not currently used by the computer 200 and data in the logical device has all cleared to "0". "Unknown" denotes that the logical device is not currently used by the computer 200 and the contents of data in the logical device are unknown.

FIG. 9 is a diagram showing a network-zone member management table 810 and a network-zone management table 820. Registered in the network-zone member management table 810 is information indicating to which network a corresponding port such as a fibre channel port of the storage apparatus 400 or the computer 200 belongs. When ports are assigned an identical network identifier, it means that they belong to the same network. Communication can be carried out only between the ports which belong to the same network. This table is managed by the administrative computer 300 and used when the system manager determines whether communication is possible between two ports in storage-pool device allocation processing 1000 and data-state-unknown device allocation processing 3500 performed through the GUI on the administrative computer 300.

Registered in the network-zone management table 820 is information indicative of correspondences between network identifiers and network names. For example, the network name corresponding to the network identifier 1 is "FC1".

FIG. 10 is a diagram showing a storage-port management table 830 and a computer-port management table 840. Registered in the storage-port management table 830 are identifiers corresponding to the storage apparatuses 400, channel adapter numbers corresponding to the channel adapters 500 of the storage apparatus 400, and storage port identifiers. The storage-port management table 830 is managed by the administrative computer 300 and used when the system manager searches for the channel adapter 500 and the storage apparatus 400 with the port from the storage port identifier in the storage-pool device allocation processing 1000 and the data-state-unknown device allocation processing 3500 performed through the GUI on the administrative computer 300.

Registered in the computer-port management table 840 are computer identifiers indicative of the computers 200 and computer port identifiers. The computer-port management table 840 is managed by the administrative computer 300 and used to obtain an identifier corresponding to a port of the computer 200 in the storage-pool device allocation processing 1000 and the data-state-unknown device allocation processing 3500 which are performed in the administrative computer 300 when the system manager uses the GUI.

According to the present invention, when the logical device of the storage apparatus 400 is allocated to the computer 200, or when the logical device is returned to the storage pool, or in both cases, the degree of data erasure is changed according to the level of confidentiality set by the user.

Specifically, when the importance of data stored in the logical device is high and the user has set a high level of confidentiality, if the logical device is restored to the storage pool, the data initialization for writing data of all "0" over the logical device is performed. On the other hand, when the importance of data stored in the logical device is low and the user has set a low level of confidentiality, if the logical device is restored to the storage pool, the management-area initialization for erasing only management data is performed.

In the embodiment, the confidentiality is defined in three levels, namely "High", "Low" and "No Level". The "High" and "Low" levels of confidentiality are brought into correspondence with the data initialization and the management-area initialization, respectively. When the confidentiality is assigned "No Level", for example, because the system manager has not set the confidentiality yet, the data initialization is performed in the same manner as in the high level of confidentiality to protect the confidentiality of data.

Further, if the storage apparatus 400 has the above-mentioned configuration for erasing the data of the storage apparatus 400 using the bitmap, the data-erasing processing for clearing the bitmap to zero can be adopted for "High" or "Low" level or "No Level" of data confidentiality. Such processing can also be adopted for a new level of confidentiality (for example, "Medium"). On the other hand, if the hard disk drive 460 has the above-mentioned configuration for erasing data using the bitmap, the processing for instructing the disk adapter 550 of the storage apparatus 400 to erase data using the bitmap may be adopted for the level of data confidentiality such as the "Medium" or "Low" level.

The following will describe processing performed on the administrative computer 300 when the system manager operates the allocation of the logical devices or the like using the GUI shown in FIG. 7.

Figure 11:
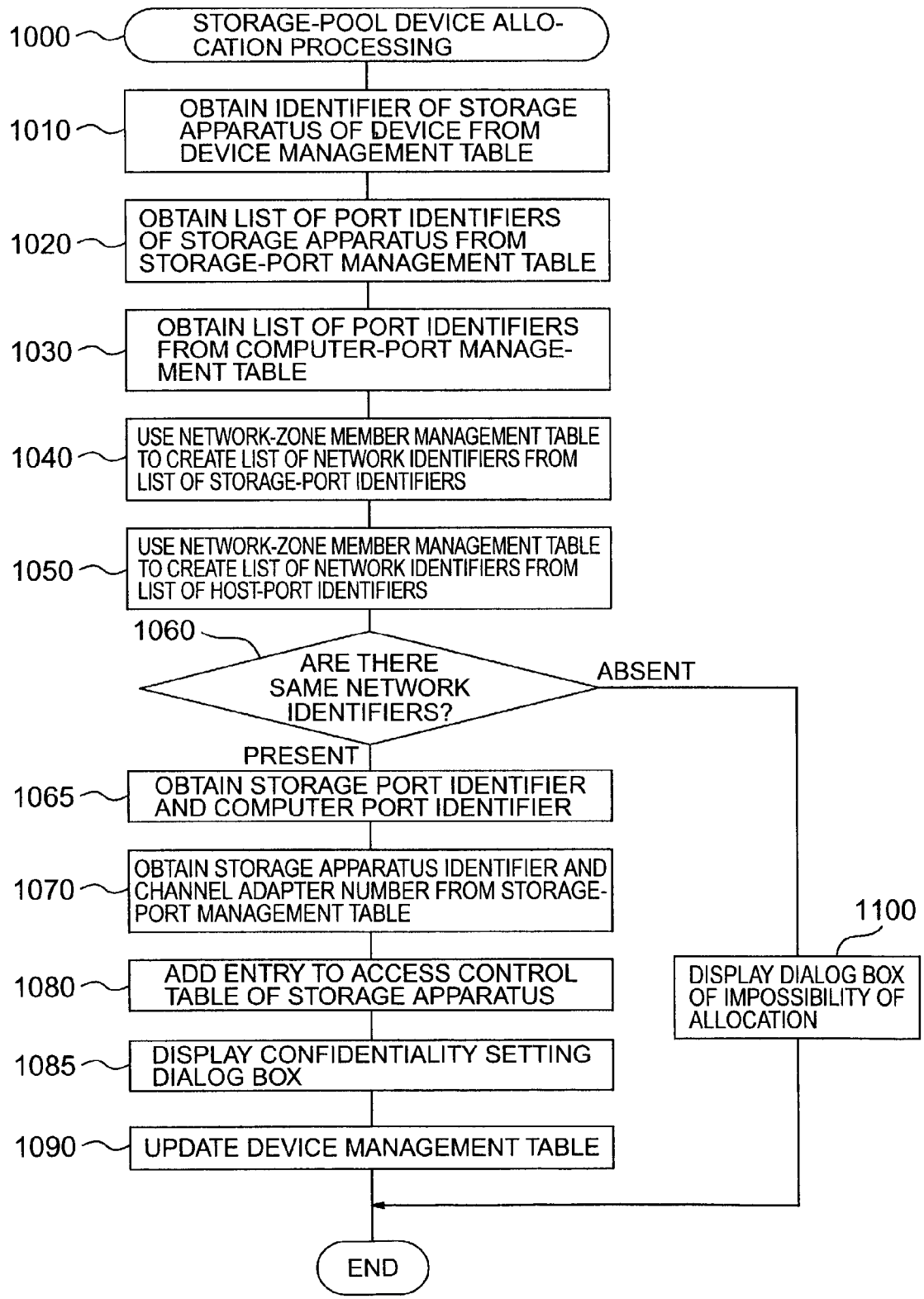
FIG. 11 is a flowchart showing process steps of storage-pool device allocation processing.

FIG. 11 is a flowchart showing process steps of the storage-pool device allocation processing 1000 to be performed when the system manager uses a mouse or the like to move a cylinder from the rectangle 2 representative of the storage pool to any rectangle 1 representative of the computer 200. After completion of this processing, the computer 200 is allowed to newly use the logical device of the storage apparatus 400.

First, the administrative computer 300 obtains, from the device management table 800, an identifier corresponding to the logical device represented by the cylinder (step 1010).

Then, the administrative computer 300 obtains, from the storage-port management table 830, a list of storage port identifiers corresponding to the logical device identifier obtained in step 1010 (step 1020).

Further, the administrative computer 300 obtains from the computer-port management table 840 a list of computer port identifiers corresponding to the computer 200 to which the cylinder representative of the logical device is allocated (step 1030).

Further, the administrative computer 300 uses the network-zone member management table 810 to create a list of network identifiers corresponding to the storage port identifiers obtained in step 1020. At this time, when there are any network identifiers overlapped each other, the administrative computer 300 eliminates the overlapped network identifiers from the list except for one of them (step 1040).

After that, the administrative computer 300 uses the network-zone member management table 810 to create a list of network identifiers corresponding to the computer port identifiers obtained in step 1030. At this time, when there are any network identifiers overlapped each other, the administrative computer 300 eliminates the overlapped network identifiers from the list except for one of them (step 1050).

The administrative computer 300 then compares the list of network identifiers created in step 1040 with the list of network identifiers created in step 1050 (step 1060).

When both lists contain an identical network identifier, the administrative computer 300 obtains a storage port identifier, which corresponds to the network identifier matched in step 1060, from the list of storage port identifiers obtained in step 1020, and obtains a computer port identifier, which corresponds to the network identifier matched in step 1060, from the list of computer port identifiers obtained in step 1030 (step 1065).

The administrative computer 300 uses the storage port identifier which is obtained in step 1065, to obtain the storage apparatus identifier and the channel adapter number from the storage-port management table 830 (step 1070). Further, the administrative computer 300 adds the storage port identifier and computer port identifier obtained in step 1065 and the channel adapter number obtained in step 1070 to the storage access control table 700 of the storage apparatus 400 corresponding to the storage apparatus identifier obtained in step 1070. Specifically, when adding entries to the storage access control table 700, the administrative computer 300 issues addition instructions to the storage apparatus 400 (step 1080).

Furthermore, the administrative computer 300 displays a confidentiality setting dialog box on its display screen to urge the system manager to enter a level of confidentiality of the logical device newly set. If nothing is entered, "No Level" is used as the level of confidentiality (step 1085).

The administrative computer 300 receiving any level of confidentiality changes the data state of the device management table 800 corresponding to the set logical device from "Initialized" to "Used". Also, the administrative computer 300 changes information on the computer using the logical device (i.e., the using computer) from "None" to the computer identifier to which the device is assigned. Thereafter, the administrative computer 300 sets the level of confidentially entered by the system manager in step 1085, and then ends the processing (step 1090).

On the other hand, when there are no network identifiers which matches with each other in step 1060, the administrative computer 300 displays a dialog box for to indicating the impossibility of allocation to the system manager, and then ends the processing (step 1100).

Figure 12:
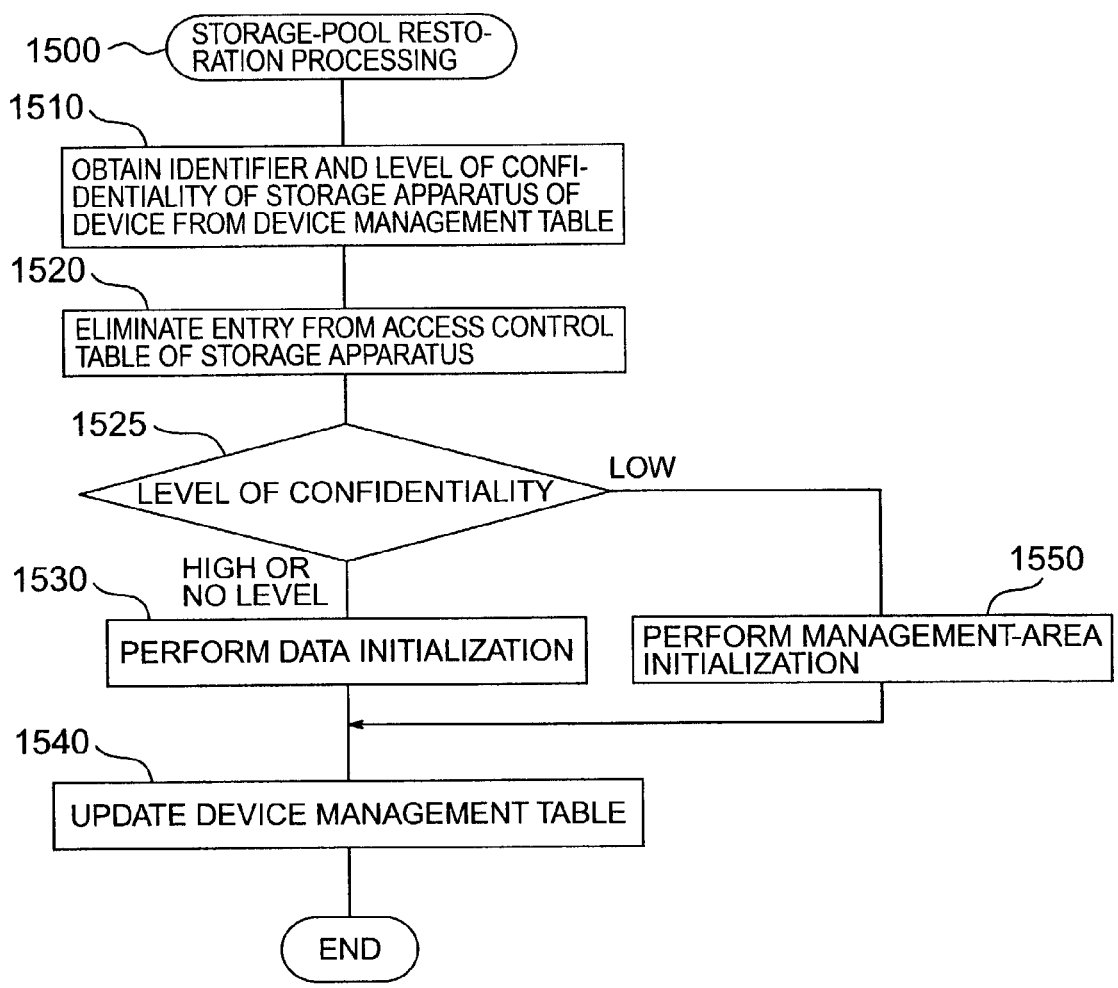
FIG. 12 is a flowchart showing process steps of storage-pool restoration processing.

FIG. 12 is a flowchart showing storage-pool restoration processing 150 to be performed when the system manager uses a pointer such as a mouse to move a cylinder displayed in any rectangle 1 representative of the computer 200 to the rectangle representative of the storage pool. In the embodiment, the system manager performs this processing to restore to the storage pool the logical device which is no longer necessary for the computer 200, so that the capacity of the storage pool usable by the other computers 200 can be changed.

The administrative computer 300 obtains, from the device management table 800, the identifier and the level of confidentiality of the storage apparatus 400 corresponding to the logical device represented by the moved cylinder (step 1510).

The administrative computer 300 eliminates the entry of the device identifier corresponding to the moved cylinder from the storage access control table 700 of the storage apparatus 400 corresponding to the storage apparatus identifier obtained in step 1510. It disables any I/O request to the device from being processed (step 1520).

After that, the administrative computer 300 judges the level of confidentiality obtained in step 1510 (step 1525).

When the level is "High" or "No Level", the administrative computer 300 instructs the storage apparatus 400 to perform the data initialization. If the processing corresponding to the set level of confidentiality is the above-mentioned data initialization based on the bitmap, the storage apparatus 400 performs the above-mentioned data initialization based on the bitmap (step 1530). On the other hand, when the level is "Low", the administrative computer 300 performs the management-area initialization (step 1550).

After that, the administrative computer 300 changes, in the device management table 800, the data state corresponding to the erased logical device to "Initialized", the information on the accessing computer to "None", and the information on the confidentiality to "No Level", and then ends the processing (step 1540).

Figure 13:
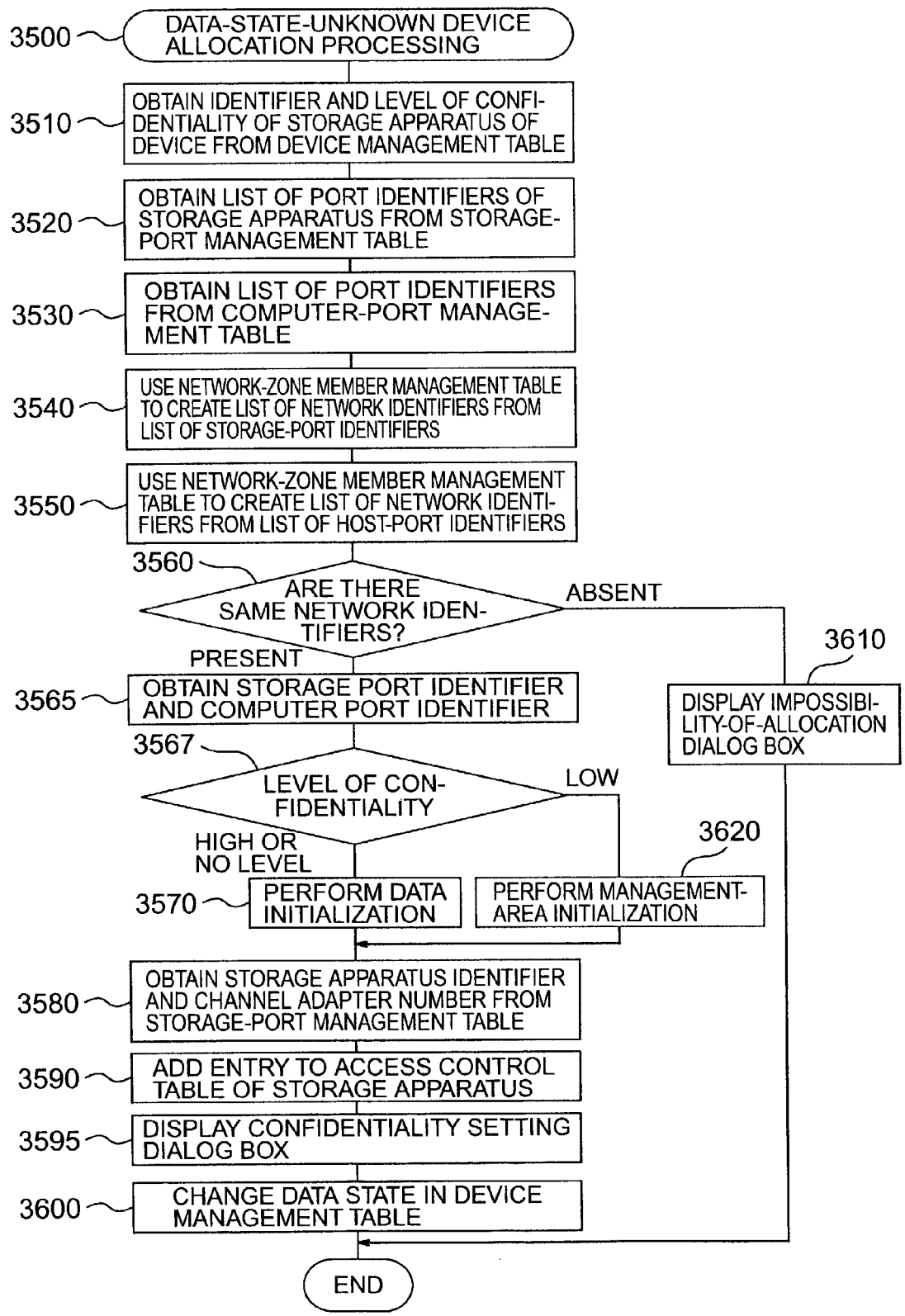
FIG. 13 is a flowchart showing process steps of data-state-unknown device allocation processing.

FIG. 13 is a flowchart showing data-state-unknown device allocation processing 3500 to be performed when the system manager uses a pointer such as a mouse on the screen to move a cylinder displayed in the rectangle 3 representative of the data-unknown state to any rectangle 1 representative of the computer 200. After completion of this processing, the computer 200 is allowed to newly use the logical device of the storage apparatus 400. In the processing, since the data state of the logical device is "Unknown", the device data need to be initialized at the time of device allocation.

The administrative computer 300 obtains, from the device management table 800, the identifier and the level of confidentiality of the storage apparatus 400 corresponding to the logical device represented by the cylinder (step 3510).

Then, the administrative computer 300 obtains, from the storage-port management table 830, the list of storage port identifiers corresponding to the identifier of the storage apparatus 400 obtained in step 3510 (step 3520).

Further, the administrative computer 300 obtains, from the computer-port management table 840, the list of computer port identifiers corresponding to the computer 200 to which the cylinder corresponding to the logical device is moved (step 3530).

Then, the administrative computer 300 uses the network-zone member management table 810 to create the list of network identifiers corresponding to the storage port identifiers obtained in step 3520. At this time, when there are any overlapped network identifiers, the administrative computer 300 eliminates the overlap of network identifiers (step 3540).

Furthermore, the administrative computer 300 uses the network-zone member management table 810 to create the list of network identifiers corresponding to the computer port identifiers obtained in step 3530. At this time, the administrative computer 300 eliminates the overlap of network identifiers, if any (step 3550).

The administrative computer 300 compares the list of network identifiers created in step 3540 with the list of network identifiers created in step 3550 (step 3560).

When both lists contain any identical network identifier, the administrative computer 300 obtains, from the list of storage port identifiers obtained in step 3520, the storage port identifier corresponding to the network identifiers determined in step 3560 to match with each other. Further, the administrative computer 300 obtains, from the list of computer port identifiers obtained in step 3530, the computer port identifier corresponding to the network identifiers determined in step 3560 to match with each other (step 3565).

After that, the administrative computer 300 judges the level of confidentiality of the logical device obtained in step 3510 (step 3567). When the level of confidentiality of the logical device is "High" or "No Level", the administrative computer 300 instructs the storage apparatus 400 corresponding to the logical device to perform the data initialization (step 3570). On the other hand, when the level of confidentiality is "Low", the administrative computer 300 instructs the storage apparatus 400 to perform the management-area initialization (step 3620). If the data initialization corresponding to the set level of confidentiality is the data initialization based on the bitmap, the storage apparatus 400 corresponding to the logical device performs the data initialization based on the bitmap.

The administrative computer 300 uses the storage port identifier obtained in step 3565 to obtain the storage apparatus identifier and the channel adapter number from the storage-port management table 830 (step 3580).

After that, the administrative computer 300 adds, to the entries of the storage access control table 700 of the storage apparatus 400 corresponding to the storage apparatus identifier obtained in step 3580, the storage port identifier and computer port identifier obtained in step 3565 and information on the channel adapter number obtained in step 3580 (step 3590).

The administrative computer 300 displays the confidentiality setting dialog box on its display screen to urge the system manager to enter the level of confidentiality. If nothing is entered, "No Level" is set as the level of confidentiality (step 3595).

The administrative computer 300 changes, in the device management table 800, the data state from "Initialized" to "Used", and the accessing computer from "None" to the computer identifier corresponding to the computer 200 to which the device is allocated. Then, the administrative computer 300 sets the level of confidentially, which is entered by the system manager in step 3595, to the logical device, and then ends the processing (step 3600).

On the other hand, when no network identifiers which match with each other are found in step 3560, the administrative computer 300 displays the dialog box to inform the system manager of the impossibility of allocation, and then ends the processing (step 3610).

Figure 14:
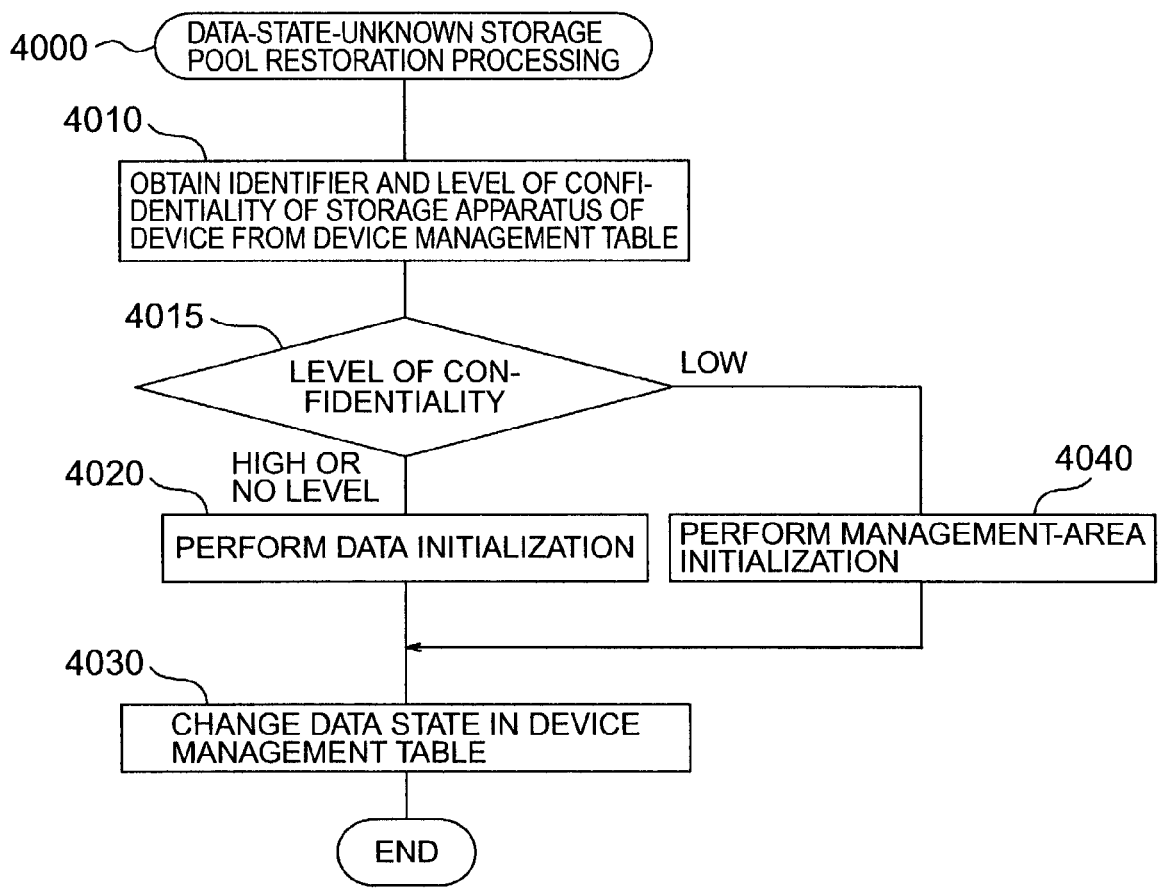
FIG. 14 is a flowchart showing process steps of data-state-unknown device storage-pool restoration processing.

FIG. 14 is a flowchart showing data-state-unknown storage pool restoration processing 4000 to be performed when the system manager uses a pointing device such as a mouse on the screen to move a cylinder indicative of a logical device displayed in the rectangle 3 representative of the unknown data state to the rectangle 2 representative of the storage pool. In performing this processing, the system user restores the logical device the data state of which is unknown to the storage pool to increase the capacity of the storage pool usable by the computer 200.

The administrative computer 300 obtains, from the device management table 800, the identifier and the level of confidentiality of the storage apparatus 400 corresponding to the logical device represented by the cylinder moved on the screen (step 4010).

Then, the administrative computer 300 eliminates the entry of the device identifier corresponding to the moved logical device from the storage access control table 700 of the storage apparatus 400 corresponding to the storage apparatus identifier obtained in step 4010. It disables any I/O request to this device from being processed (step 4020).

Further, the administrative computer 300 judges the level of confidentiality obtained in step 4010 (step 4015). When the level of confidentiality of the moved logical device is "High" or "No Level", the administrative computer 300 instructs the storage apparatus 400 to perform the data initialization (step 4030). On the other hand, when the level of confidentiality is "Low", the administrative computer 300 instructs the storage apparatus 400 to perform the management-area initialization (step 4040). If the processing corresponding to the set level of confidentiality of the logical device is the data initialization based on the bitmap, the administrative computer 300 instructs the storage apparatus 400 to perform the data initialization based on the bitmap.

Finally, the administrative computer 300 changes, in the device management table 800, the data state to "Initialized", changes the level of confidentiality to "No Level", and then ends the processing (step 4030).

According to the present invention, when allocating the logical device managed in the storage pool to the computer 200, the administrative computer 300 instructs the storage apparatus 400 to perform processing for clearing to "0" the management information written by the computer 200 which has previously used the logical device. This makes it possible to avoid trouble after allocation of the logical device, and hence lighten the workload for the system manager.

Also, according to the present invention, when the logical device is allocated from the storage pool, the level of confidentiality is set for the logical device according to the importance of data to be stored. At the time of logical-device allocation or logical device deletion, data are erased according to this level of confidentiality. Therefore, if the high level of confidentiality is set for the logical device, all data are initialized or cleared to "0" when the logical device is restored to the storage pool. This makes it possible to prevent leakage of data due to a mistake by the system manager.

Further, the present invention can be used by a storage service provider (SSP) which lends storage capacity or extent to a customer. Specifically, the SSP offers the customer to use a logical device allocated by the SSP. When the customer no longer uses the logical device lent from the SSP, the customer needs to erase data stored in the logical device before returning the logical device to the SSP (before the SSP restores the logical device to the storage pool).

According to the present invention, the SSP can easily offer to the customer the data erasing service which ensures erasure of data stored in the logical device used by the customer.

For example, when allocating the logical device to the customer who asks for the data erasing service, the SSP can set the high level of confidentiality to automatically delete data in the logical device when the logical device becomes unnecessary and is restored to the storage pool.

The present invention makes it possible to avoid trouble after allocation of a logical device, and hence lighten workload for a system manager.

The present invention also makes it possible to prevent leakage of data due to a mistake by a system manager.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system comprising:
    a plurality of storage apparatuses storing data; and
    a storage controller which transmits and receives said data between an external computer and said plurality of storage apparatuses, and controls said plurality of storage apparatuses;
    wherein logical devices each representing a logical storage area are defined on said plurality of storage apparatuses; and
    wherein when one logical device of said plurality of logical devices is in a state of allocation to said external computer and stores data used by said external computer, and said one logical device is deallocated from said external computer, said storage controller performs a processing regarding said one logical device to be deallocated, according to a rule predetermined regarding said one logical device.

2. A storage system according to claim 1, wherein said rule is set when said one logical device is allocated to said external computer.

3. A storage system according to claim 2, further comprising a managing computer connected to said storage system, wherein said managing computer sets said rule.

4. A storage system according to claim 3, wherein said managing computer comprises an input device which accepts an input of said rule.

5. A storage system according to claim 1, wherein
said rule makes said storage controller rewrite said data used by said external computer and stored in said one logical device to be deallocated, to a predetermined value.

6. A storage system according to claim 1, wherein
said storage controller has a memory,
said storage apparatuses are each partitioned into a plurality of storage areas storing data;
said storage controller has a bit map corresponding to each storage area on said memory; and
said rule makes each storage controller change a bit value of the bit map corresponding to the logical storage area included in said one logical device to be deallocated, when said one logical device is deallocated.

7. A storage system according to claim 6, wherein said storage controller, when the storage controller receives a command for reading data from said storage area corresponding to said bit map on which said bit value is set, outputs an independent value independent of the data stored in said storage area as data to the other storage apparatuses.

8. A storage system according to claim 7, wherein said independent value is 0.

9. A storage system according to claim 1, wherein
when said one logical device is allocated to said external computer, management information indicating that said one logical device is allocated to said external computer is set; and
said rule makes said storage controller delete said management information when said one logical device is deallocated from said external computer.

10. A storage system according to claim 1, wherein said rule is different according to the level of confidentiality of data stored in said storage apparatus.

11. A storage system according to claim 10,
wherein said rule is set when said one logical device is allocated to said external computer.

12. A storage system according to claim 11, further comprising a managing computer connected to said storage system, wherein said managing computer sets said rule.

13. A storage system according to claim 12,
wherein said managing computer comprises an input device which accepts an input of said rule.

14. A storage system according to claim 10,
wherein said rule makes said storage controller rewrite said data used by said external computer stored in said one logical device to be deallocated, to a predetermined value.

15. A storage system according to claim 10,
wherein said storage controller has a memory,
said storage apparatuses are each partitioned into a plurality of storage areas storing data;
said storage controller has a bit map corresponding to each storage area on said memory; and
said rule makes each storage controller change a bit value of the bit map corresponding to the logical storage area included in said one logical device to be deallocated, when said one logical device is deallocated.

16. A storage system according to claim 15, wherein said storage controller, when the storage controller receives a command for reading data from said storage area corresponding to said bit map on which said bit value is set, outputs an independent value independent of the data stored in said storage area as data to the other storage apparatuses.

17. A storage system according to claim 16, wherein said independent value is 0.

18. A storage system according to claim 10,
wherein when said one logical device is allocated to said external computer, management information indicating that said one logical device is allocated to said external computer is set; and
said rule makes said storage controller delete said management information when said one logical device is deallocated from said external computer.

* * * * *